United States Patent [19]

Waaben

[11] 3,719,832

[45] March 6, 1973

[54] TIME DIVISION MULTIPLEXER USING CHARGE STORAGE DIODE LINE CIRCUITS

[75] Inventor: Sigurd Gunther Waaben, Princeton, N.J.

[73] Assignee: Bell Telephone Laboratories Incorporated, Murray Hill, Berkeley Heights, N.J.

[22] Filed: June 16, 1971

[21] Appl. No.: 153,493

[52] U.S. Cl. ....................307/243, 307/319, 328/151

[51] Int. Cl. ..............................................H03k 17/56

[58] Field of Search ...............307/319, 243; 328/151

[56] References Cited

UNITED STATES PATENTS

| | | | |
|---|---|---|---|
| 3,609,404 | 9/1971 | Uchida | 307/319 |
| 3,098,214 | 7/1963 | Windes et al. | 307/243 |
| 3,517,132 | 6/1970 | Rimlinger | 307/243 |
| 3,187,605 | 5/1965 | Herzog | 307/319 |

*Primary Examiner*—James W. Lawrence
*Assistant Examiner*—Harold A. Dixon
*Attorney*—R. J. Guenther et al.

[57] ABSTRACT

A charge storage diode in a line circuit is charged to different levels by a signal current driven therethrough in the forward direction so that diode charge tracks the instantaneous signal amplitude. A reverse drive is applied to the diode, at a time when it is desired to sample the line signal current amplitude, for transferring the diode charge to a precharged capacitor connected in series with the diode in a separate circuit from the signal current circuit. The reverse drive is maintained for a sufficient time to remove substantially all charge from the diode in the presence of a maximum anticipated precharge level on the capacitor. A plurality of such diode signal current circuits, each having individual ground return connection points to a common ground plane, are fanned into a single capacitor connected to a further connection point of the same plane; and the respective diode reverse drives are controlled so that the capacitor receives samples of line signal currents from the diode circuits in a predetermined sequence.

14 Claims, 4 Drawing Figures

INVENTOR
S. G. WAABEN
BY Charles Scott Phelan
ATTORNEY

TIME DIVISION MULTIPLEXER USING CHARGE STORAGE DIODE LINE CIRCUITS

BACKGROUND OF THE INVENTION

1. Field of the Invention

This invention relates to charge transfer circuits and particularly to such circuits which are employed in time division multiplexing a plurality of signal circuits.

2. Description of the Prior Art

Charge storage diodes are known in the art and are characterized by the fact that the application of a forward current to such a semiconductor diode causes an accumulation of minority current carriers in the diode because such carriers are generated by the current at a rate which is faster than the carrier recombination rate of the diode material. Upon termination of the forward current, a reverse current quickly depletes the supply of accumulated carriers with the result that the diode presents an extremely low impedance to the reverse current, while the accumulated carriers are being swept out of the diode; but it presents a high reverse impedance as soon as the supply of accumulated carriers is exhausted. A charge storage diode is normally charged by applying current thereto from a first circuit and discharged by driving a reverse current therethrough in a second circuit. On example of such a charge storage diode circuit arrangement is found in FIG. 3 of the U.S. Pat. No. 3,484,764 to T. R. Finch and S. G. Waaben.

It is also known in the art to cause plural line circuits of a communication system to time share a common intergroup bus by means of resonant transfer techniques. In a resonant transfer connection, line signal samples which are held in line circuit capacitors are transferred in sequence through an inductive circuit connection to an intergroup bus capacitor so that the samples may appear in time sequence, i.e., time division multiplexed, on the latter bus. However, the inductive connection is not convenient for utilization in integrated circuit systems. Also, the entire resonant transfer arrangement is subject to crosstalk among the signal channels represented by the various lines unless great care is exercised in construction and control. The arrangement also is subject to noise because the various parts of the circuit have different connections to a common ground reference plane, or bus.

It is well known that different electrical connection points on a common "nominal" ground reference plane can exist at different voltage levels that are difficult to predict and control. Some indication of the problems involved in the area can be obtained by a consideration of the book *Grounding and Shielding Techniques in Instrumentation* by R. Morrison, John Wiley & Sons, Inc., New York, 1967. Similarly, a passing reference to the problem in relation to an electronic telephone switching system is found at page 2023 in Part 1 of the September 1964 issue of *The Bell System Technical Journal.*

It is, therefore, one object of the present invention to isolate signal circuits from the effects of different voltages at different connection points to a common ground reference plane.

It is another object to improve time division multiplexing circuits.

A further object is to facilitate time division multiplexing signal operations in such a way as to make the advantages of integrated semiconductor circuit technology more readily available thereto.

Still another object is to reduce the need for critical design and control in time division multiplexing circuits.

SUMMARY OF THE INVENTION

The foregoing objects of the present invention are realized in an illustrative embodiment wherein a charge storage diode is charged in a first, or line signal, circuit path and is thereafter discharged in a second circuit path through a capacitor for a time which, in consideration of the maximum possible precharged condition on the capacitor, is sufficient to transfer substantially the full diode charge to the capacitor. A plurality of the diode-charging, line signal circuits are connected to a common terminal of the capacitor; and their respective charge storage diodes are discharged at different times into the capacitor. The resulting successive capacitor voltage signals represent a time division multiplex signal pulse train of the signal samples from the various line signal circuits.

It is one feature of the invention that at least some of the diode charging circuits and the capacitor have differently located connection points to a common ground reference plane, such that those connection points are subject to having potential differences therebetween across the common ground reference plane.

It is another feature that asymmetrically conducting devices are included in the line circuits to prevent branching of the charge storage diode reverse drive current; and similar devices are included in series between each storage diode and the common capacitor to prevent branching of the discharge current of one line circuit from entering the charge storage diode of another line circuit.

A further feature is that the connection of each charge storage diode to the common ground reference plane in one embodiment includes electronic selectable switching means which are actuatable in a predetermined sequence for opening the respective line circuits during the diode discharging operation therefor.

It is a feature of still another embodiment that a terminating impedance, having an impedance which is substantially the same as the characteristic impedance of both the line circuit and the diode discharging circuit, completes the line circuit to the ground plane so that the diode reverse current sequencing among the different line circuits does not cause significant branching of the reverse drive current through that impedance of a selected line circuit.

BRIEF DESCRIPTION OF THE DRAWING

A more complete understanding of the present invention and its various features, objects, and advantages may be obtained from the following detailed description when taken in connection with the appended claims and the attached drawing in which:

DETAILED DESCRIPTION

Figure 1:
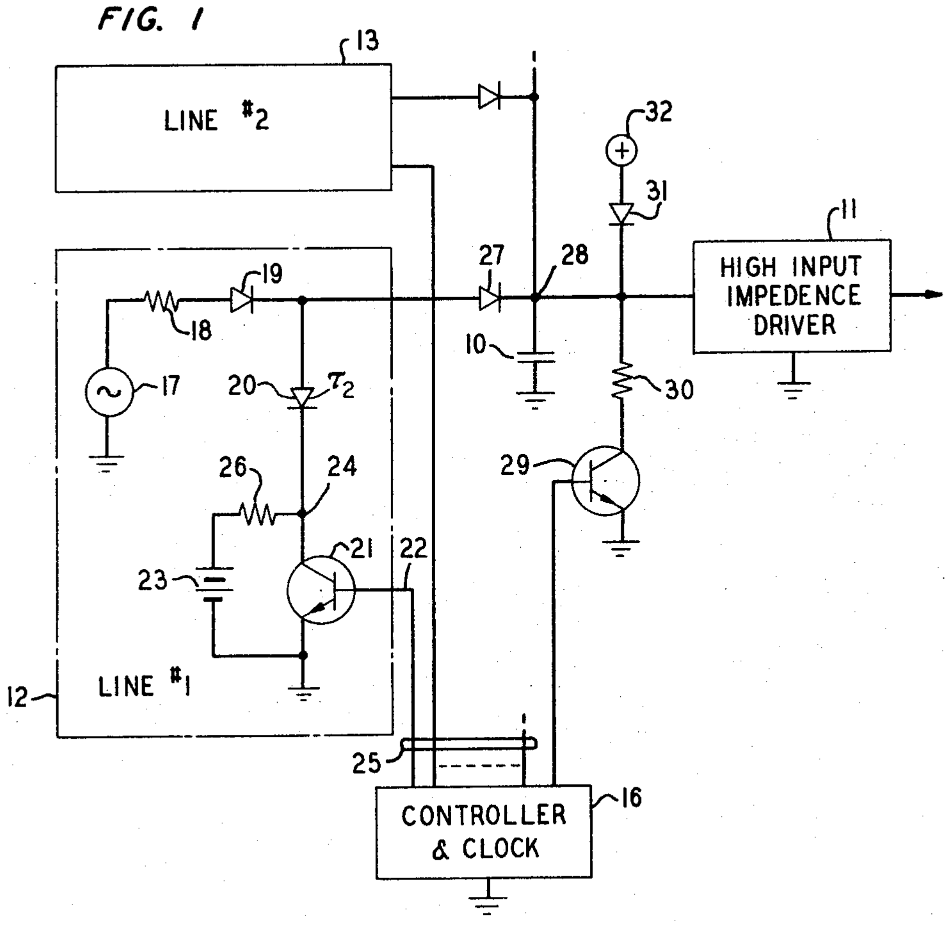
FIG. 1 is a simplified diagram, partly in schematic form and partly in block and line diagram form, of a time division multiplexing circuit in accordance with the present invention.

A plurality of line signal circuits, only two of which are specifically indicated in FIG. 1, are arranged to supply signal samples by way of a common sample and hold capacitor 10 to a high input impedance driver 11. That driver produces at an output connection thereof with respect to ground, a time division multiplex signal pulse train corresponding to the information content of the signal samples derived from the line signal circuits.

Two line signal circuits 12 and 13 are specifically illustrated in FIG. 1 to demonstrate the operation of the present invention, but many more such circuits are advantageously employed in a practical multiplexer operation. Since all of the line signal circuits are advantageously of essentially the same type, only the circuit 12 is herein discussed in detail. A controller and clock circuit 16 coordinates the various functions in the multiplexer circuit of FIG. 1, and advantageously represents a stored program control system processor for an electronic switching system wherein processor memory (not shown) contains data and program instructions to be utilized in the various arithmetic and logic functions that are needed to secure a coordinated completion of call connections for communications among system subscribers.

A subscriber in the simplified system of FIG. 1 is represented by one of the line signal circuits, such as the circuit 12. The principal function of the controller and clock circuit 16, insofar as the FIG. 1 embodiment is concerned, is to provide clock signals to transistor gates, thereby causing gate operation at the correct times and for the correct intervals to secure proper multiplexer operation. Details of the design, organization, and operation of circuits such as the controller and clock circuit 16 are well known in the art; and disclosure thereof here is not required in order to convey an understanding of the present invention.

In the line signal circuit 12 of FIG. 1, a signal source 17 advantageously supplies analog signals with respect to ground through a current-limiting resistor 18 and a source-isolating diode 19 to an anode connection of a charge storage diode 20. The invention also is useful where source 17 supplies digital signals, e.g., a train of pulse code modulated pulses; but the greatest advantage is realized with analog signals because of the greater amplitude sensitivity. Diode 20 is of the type hereinbefore outlined which accumulates minority current carriers in response to the conduction of a forward current through the diodes. This charge storage diode effect is schematically represented in the drawing by a conventional diode symbol with a $T_2$ symbol representative of the minority carrier lifetime attached to the arrowhead portion at the anode terminal thereof. Other diodes, e.g., diode 19, shown in the drawing are of the type, sometimes called a Schottky diode, which is so designed that there is no substantial carrier accumulation for forward currents at multiplexer frequencies; and these are indicated as standard diode schematic representations.

The line signal current path from the diode 20 is completed to ground through the collector-emitter conduction path of an n-p-n transistor 21 that is normally held in a conducting state by an output signal from the controller and clock circuit 16 on a connection circuit 22 to the base electrode of transistor 21. Circuit 22 is one of a group 25 of circuits similarly coupled to the various line circuits. This control connection to the base electrode of transistor 21, and similar control connections to other transistors from the circuit 16, are advantageously direct current, or galvanic, connections lacking lumped inductance and which facilitate rapid circuit operation and relatively easy incorporation into a semiconductor integrated circuit version of the circuit. The ground connections schematically indicated for the source 17 and at the emitter electrode of transistor 21 in line circuit 12 represent connections to different points on a common ground plane, and such plane is the same one utilized for all of the circuits indicated in FIG. 1. In actual practice the ground plane is a bus conductor, not separately shown, extending among the circuits of FIG. 1 in an equipment bay within a communication switching office. The same bus may also extend among other bays within that office.

Diode 19 serves to isolate the source 17 from the current discharge path for the charge storage diode 20 during intervals when that diode is being discharged. Diode 20 advantageously has a carrier recombination time which is sufficiently low to permit the accumulated charge in the diode 20 to track the analog line signal provided by the source 17. Thus, the recombination time for the diode 20 is substantially less than the period of the analog signal component of highest frequency in the line circuit from source 17. This relationship allows the diode charge to track line signal variations. By the same token, diode reverse charge transfer time, i.e., the time needed to utilize a reverse current to transfer accumulated charge to capacitor 10, must be substantially less than the recombination time to assure accurate charge transfer without undue distortion by recombination of accumulated carriers within diode 20. If source 17 were providing a digital signal representation, the recombination time can be much longer and could be about as long as the digital signal bit period.

Transistor 21 is normally biased for conduction as previously noted. Such conduction is at a level which is just below, or just at, the saturated current conduction level for the transistor so that the transistor can be turned off to terminate line signal conduction through diode 20 without undue delay.

At recurrent clock times, transistor 21 is biased off, i.e., to a nonconducting condition, by the signal on the circuit 22. When that occurs, a battery 23, which is connected in series with a current limiting resistor 26 across the collector-emitter path of transistor 21, supplies a reverse drive current to the diode 20. That reverse current flows through the diode 20, a line-isolating diode 27, and the capacitor 10 to ground. The battery voltage is selected at a sufficient level to sweep substantially the entire accumulated charge from the diode 20 for the largest anticipated analog signal amplitude from source 17 into the capacitor 10. Such charge-sweep operation must be completed during the time interval that transistor 21 is held in the nonconducting state. There is also the aforementioned further limitation that actual discharge must occur fast enough to avoid recombination distortion of the transferred sample.

Resistor 26 limits the current from battery 23 which can flow through transistor 21 when that transistor is in a conducting state. Since only the diode 27 connects charge storage diode 20 to capacitor 10, it will be seen that such connection is completely galvanic in nature and permits no alternating current coupling devices, such as inductances or capacitors, between the diode and the capacitor 10. This type of connection for a charge storage diode is sometimes called a self-limiting charge transfer connection. Battery 23 and resistor 26 are shown as a part of the line circuit 12 in FIG. 1 for convenience of illustration. However, the battery could as easily comprise a single source which serves all of the line signal circuits that are coupled to the common terminal 28 of the capacitor 10. Alternatively, the common battery 23 can be replaced by a transistor switch circuit which is pulsed on when transistor 21 is pulsed off to provide the reverse current to the diode 20 in whichever one of the line circuits, such as 12 and 13, has its transistor 21 turned off by an output of the controller and clock circuit 16. Several different formats for the circuits which complete the ground return path for the line signal circuit and which provide reverse current drive to the charge storage diode will be subsequently considered in connection with FIGS. 2 through 4.

Controller and clock circuit 16 periodically turns a transistor 29 on to discharge the common sampling capacitor 10 through a resistor 30 to a voltage level which is fixed by a clamping diode 31 which couples a positive potential source 32 to the connection terminal 28 in the circuit between capacitor 10 and resistor 30. Source 32 is schematically represented as a circled plus sign in accordance with the system of schematic notation for voltage sources wherein a circled polarity sign indicates the circuit point to which a terminal of corresponding polarity for a source, not otherwise specifically shown, is connected. Such source is understood from the schematic representation to have its terminal of opposite polarity connected to ground.

The minimum voltage charge limit fixed for capacitor 10 by diode 31 and source 32 is a voltage level which is greater than the largest peak signal excursion anticipated on any of the line signal circuits, such as the circuits 12 and 13. It is thus assured that all of the line-isolating diodes, such as the diode 27, will be reversely biased whenever the charge storage diode 20 of the corresponding line is conducting in the forward direction. However, the clamp voltage level is less than the terminal voltage of the battery 23 in order to assure that, when a line circuit transistor 21 is biased to a nonconducting condition, the line-isolating diode for that line will be biased into forward conduction by the battery 23 so that the charge stored on charge storage diode 20 is transferred through diode 27 to capacitor 10.

Figure 4:
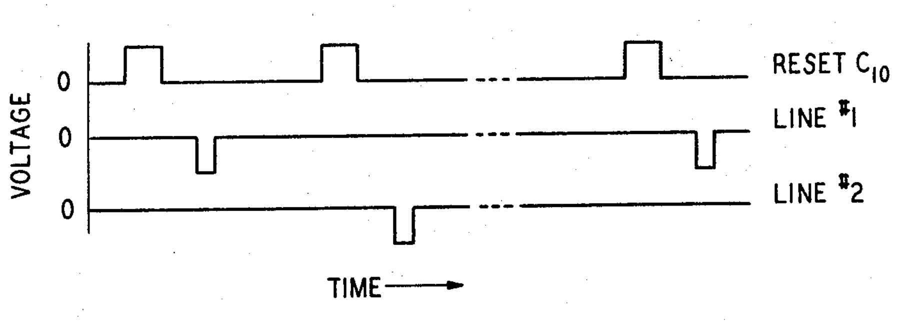
FIG. 4 is a family of control signal diagrams for illustrating the sequence of operations in the multiplexer of FIG. 1.

FIG. 4 shows a family of control signal diagrams drawn to a common time scale and illustrating various signals supplied by the controller and clock circuit 16 for operating the multiplexer of FIG. 1. Each diagram is illustrated with reference to the nominal ground, of the FIG. 1 ground connections, at the intersection of the diagram with the voltage coordinate in FIG. 4. The top diagram in FIG. 4 illustrates the sequence of control pulses that are applied to the base electrode of transistor 29 for turning that transistor on to reset the charge on capacitor 10 to the clamped voltage level between different pairs of the control pulses for line circuit transistors 21. Different sets of negative-going control pulses are provided on the various circuits of the group 25 for the different line signal circuits and their respective transistors 21. Such control pulse diagrams are shown in FIG. 4 for the line number 1 and line number 2 specifically indicated in FIG. 1. The diagrams illustrate a sequential type of sampling. Thus, beginning at the left-hand side of FIG. 4, a positive-going reset pulse initiates the clearing of capacitor 10 to its pedestal charge. A negative-going pulse then turns off the transistor 21 for line number 1 after a brief time-guard space. After the trailing edge of that turnoff pulse, another positive-going reset pulse restores the charge on capacitor 10 to the clamped level. Although the OFF-time for transistor 21 appears substantial in FIG. 4, it must be recalled that the actual time required to discharge diode 20 is only a small part of the OFF-time of transistor 21, even with resistor 26 in the circuit.

After a further time-guard space, a negative-going pulse to the transistor 21 of line number 2 initiates the discharge of the diode 20 in that line into capacitor 10; and thereafter a further reset pulse restores the charge on capacitor 10 to the clamped level. The line circuits are thus operated in sequence until the signal sample from the line number *n* is transferred to capacitor 10, and a subsequent reset control pulse restores the charge on capacitor 10 to the clamped level. At that point the sequence of line circuit operation resumes with a new negative-going control pulse to line number 1.

Figure 2:
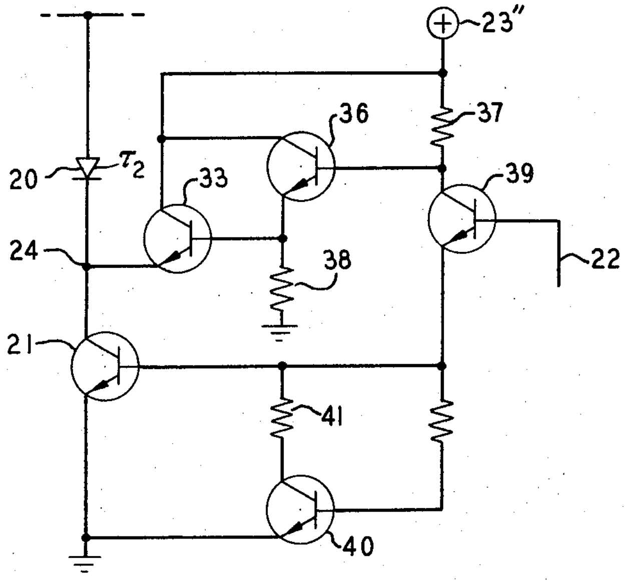
FIGS. 2 and 3 include schematic circuit diagrams of different modifications of a portion of a line circuit in the multiplexer of FIG. 1.
Figure 3:
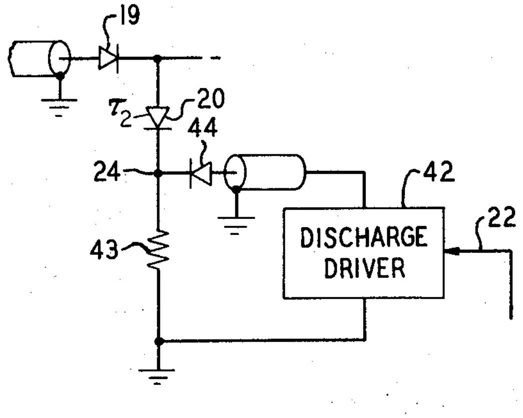

A time-guard space is allowed between line and reset control pulses in order to assure stabilization of all circuits and of the output signal to driver 11. However, in many applications of the multiplexer of FIG. 1, and particularly in those constructed using semiconductor integrated circuit technology, little or no time-guard spaces need be provided beyond clearing capacitor 10 of previously set charge information. Some such circuits may be capable of faster operation than is possible with the specific circuit configuration shown in FIG. 1, wherein the current limiting resistor 26 is included in series with the battery 23 in the discharge path for the charge storage diode 20. The circuits of FIGS. 2 and 3 illustrate different ways for meeting that possibility.

Inasmuch as the charge storage diode 20 of each line has a sufficiently low carrier recombination time to allow the diode charge to track the line signal variations, and because the accumulated charge in the diode is substantially, completely transferred to the capacitor 10 during the diode discharge phase, the sampling capacitor 10 receives precisely the signal sample prevailing at the time that transistor 21 is biased to a nonconducting state. All of the line signal circuits, such as the circuits 12 and 13, work into the same sampling capacitor 10 in the presence of the same clamp, or pedestal, precharged voltage on that capacitor.

Since the line-isolating diodes, such as the diode 27, prevent conduction from a line signal circuit toward the terminal 28 when the transistor 21 of any line is conducting, there can be no substantial crosstalk between the signal channels represented by the various lines through leakage currents between the line signal circuits. There also is no significant crosstalk by virtue of differences in voltage between the various connections to the ground bus for the multiplexer because the charge transferred is independent of such considerations. In other words, the charge stored in the diode 20 for any line signal circuit depends exclusively upon the short term average current through diode 20, which current depends upon the output voltage from the analog signal source 17 and the voltage difference instantaneously prevailing between the ground connections for the source 17 and the emitter electrode of transistor 21. That potential difference is generally negligible because those two ground connections are relatively close to one another in a normal multiplexer connection. Since the time allotted for the transfer of charge from the diode 20 to the capacitor 10 is sufficient to transfer the maximum anticipated charge, substantially all of the charge from the diode 20 is thus transferred during any discharge phase as long as that anticipated maximum has not been exceeded. No excess charge is transferred because the charge storage diode 20 presents such a high impedance in the discharge path upon depletion of the accumulated charge that the discharge path appears to be an open circuit.

In a typical multiplexer connection situation, all of the circuits shown in FIG. 1 share a common ground bus by means of connections thereto at different points. It would not be unusual in a large time division multiplex telephone system for the geographical distance between the most remote connection points on such a common ground bus for the multiplexer of FIG. 1 to be as much as 100 feet from one another, and to have as much as several volts difference between connection points for a multiplexer wherein a peak line signal of approximately ten volts is anticipated. An illustrative set of the other circuit parameters for such a typical system of about 125 lines is advantageously as follows:

Resistor 18 — 1000 ohms
Diode 20 — Recombination time 100 nanoseconds (Assumes maximum line signal frequency component of 4 kilohertz)
Battery 23 — 15 volts
Resistor 26 — 1000 ohms
Resistor 30 — 100 ohms
Capacitor 10 — 100 picofarads
Source 32 — 5 volts
Reset Control
Pulse Duration — 100 nanoseconds
Reset Pulse
Repetition
Period — 960 nanoseconds
Transistor 21
On Time — 125 microseconds
Transistor 21
Control Pulse
Duration — 20 nanoseconds
Time-Guard Space
Duration (after
reset pulse) — 100 nanoseconds Three times as many lines can be employed without reducing any time guard spaces below 100 nanoseconds. In spite of the illustrative circuit parameters just indicated, it will be apparent to those skilled in the art that there is available a wide range of variability in the parameter values to accommodate different multiplexer applications. Polarities of voltages and circuit elements such as diodes and transistors can, of course, be reversed throughout the multiplexer to operate equally well in regard to negative-going analog line signals rather than the positive-going analog line signals assumed in FIG. 1.

Output from the driver 11 in FIG. 1 is utilized in any suitable manner for time division multiplexed analog signals. For example, such signals are advantageously transmitted to a signal receiving location, not shown, at which they would be demultiplexed and the analog signal samples distributed to appropriate line signal circuits for establishing communication between pairs of line signal circuits at the multiplexer and the demultiplexer, respectively. One example of a demultiplexer for analog signal samples, and utilizing charge storage diodes in a fashion which is substantially different from that here presented, is found in my copending application Ser. No. 83,634, filed Oct. 23, 1970, entitled "Time Division Sample and Hold System Employing Charge Storage Diode in Fast Discharge Mode." The latter application is assigned to the same assignee as the present application.

FIG. 2 is a partial schematic diagram of a portion of a line signal circuit of the type utilized in FIG. 1, and which is modified to accommodate operation wherein the charge storage diode 20 is discharged in the spike discharge mode, i.e., there are essentially no resistive elements other than bulk semiconductor resistance in the discharge circuit.

In FIG. 2 the opening of the line signal circuit ground return path and closure of the discharge path for the charge storage diode take place on an EXCLUSIVE OR logic basis. This circuit is similar to the circuit of the type RG3260 high-speed NAND gate in the RAY III $T^2L$ integrated circuit group of the Raytheon Corporation. The circuit of FIG. 2 differs from that RG3260-type of circuit in that the collector resistor for two transistors 33 and 36 is eliminated in order that a low impedance, and thus a high operating speed, should be available in the operations of both the charging and the discharging circuits for capacitor 20. Base electrode bias is provided from source 23'' through a resistor 37 to the base electrode of transistor 36. That transistor is arranged in an emitter-follower type of connection, through resistor 38, to supply base electrode drive to the transistor 33. The emitter electrode of transistor 33 is connected to the common circuit terminal 24 between diode 20 and transistor 21. A control signal on circuit 22 is applied to the base electrode of a transistor 39, which utilizes resistor 37 as a collector resistor, and which has its emitter electrode connected to provide base electrode drive to transistor 21 and to a further transistor 40. The latter transistor has its collector-emitter conduction path connected in series with a collector-resistor 41 between the base and emitter electrodes of transistor 21. Thus, in the absence of a negative-going control pulse on circuit 22, transistors 39, 40, and 21 conduct to allow diode 20 to be charged. Transistors 33 and 36 are biased to a nonconducting state by the relatively low voltage at the collector electrode of the transistor 39. A negative-going control pulse on circuit 22 biases transistors 39, 40, and 21 to a non-conducting state while allowing transistors 33 and 36 to conduct a large current from source 23'' through the diode 20 in its reverse conduction direction to the capacitor 10 in FIG. 1.

FIG. 3 illustrates a further modification of a portion of a line signal circuit which reduces the number of control switches required, and thereby greatly simplifies the line signal circuit. In this modification, a discharge driver circuit 42, of any suitable form, is actuated by the control signal on circuit 22 at the line selection times to drive reverse current through an isolating diode 44 and the diode 20. The output of driver 42 is connected across a resistor 43 which is also included in the line signal circuit ground return path in lieu of the control transistor 21. Resistor 43 has a resistance which is equal to the characteristic impedance of both the line signal circuit and discharge driver 42. That resistor thus serves as a dual termination resistor for both circuits and eliminates the need to have the discharge driver conduct through a control transistor, such as the transistor 21 in FIG. 1, for long periods of time. In a typical multiplexer system operating at high speeds, the line signal circuit coupling analog signal source 17 and its corresponding current limiting-resistor 18 are connected to the diode 19 and to ground by a coaxial conductor of, for example, 50-ohm characteristic impedance. Coaxial cable of similar characteristic impedance couples the output of discharge driver 42 between terminal 24 and ground.

Although the present invention has been described in connection with particular embodiments thereof, it is to be understood that additional embodiments, applications, and modifications, which will be obvious to those skilled in the art, are included within the spirit and scope of the invention.

What is claimed is:

1. In combination, a plurality of individual line signal circuits, a plurality of charge storage diodes, each being connected in series in a different one of said circuits and poled for forward diode conduction of line signal in such circuit, a common sampling capacitor, means for connecting said capacitor in a different capacitor-diode series circuit with each of said diodes, said line circuits and said capacitor-diode series circuits including a common ground reference means with connections thereto at different points for said line circuits and said capacitor-diode series circuits, said reference means being subject to potential differences therein between connection points thereto, said potential differences being of significant magnitude in relation to line signals in said line signal circuits, and means for selectively applying a discharge current to one of said capacitor-diode series circuits in the reverse conduction direction for the diode therein substantially completely to remove to said capacitor any charge theretofore accumulated in such diode in its line signal circuit.

2. The combination in accordance with claim 1 in which each of said diodes is a semiconductor diode which stores charges for a time period which is a function of charge carrier recombination time of the diode, and said time period is smaller than the period of a predetermined maximum frequency component of signals in the line signal circuit of such diode.

3. The combination in accordance with claim 1 in which each of said line signal circuits includes, a signal source-isolating diode, and means connecting said isolating diode in series with the charge storage diode of the same line signal circuit, and poled for forward conduction in the same direction as such charge storage diode.

4. The combination in accordance with claim 1 in which said means for selectively applying discharge current in each of said line signal circuits comprises, a line-isolating diode, and means connecting the last-mentioned diode in series in the capacitor-diode series circuit for such line between the capacitor and charge storage diode of such circuit, said isolating diode being poled for forward conduction of said discharge current in such circuit.

5. The combination in accordance with claim 5 which comprises in addition means for recurrently discharging said sampling capacitor to a predetermined voltage level which is of at least sufficient amplitude for biasing to a non-conducting condition said line-isolating diode of any line circuit which is conducting said line signal in the charge storage diode thereof.

6. The combination in accordance with claim 1 in which said connecting means comprises a substantially non-reactive connection between said capacitor and each of said diodes.

7. The combination in accordance with claim 1 in which means are provided for recurrently discharging said sampling capacitor to a predetermined voltage level, control means are provided to actuate said applying means for said line signal circuits in a predetermined sequence of such circuits and for actuating said recurrent discharging means once after each actuation of one of said applying means, and substantially nonreactive circuits couple said control means for actuating said applying means and said recurrent discharging means.

8. The combination in accordance with claim 1 in which means are provided for discharging said sampling capacitor to a predetermined voltage level prior to each connection of such capacitor in a different one of said capacitor-diode series circuits.

9. The combination in accordance with claim 1 in which each of said line signal circuits is connected to a different point on said reference means through an impedance of value substantially the same as the characteristic impedance of said line signal circuit and of said discharge current applying means for such line signal circuit.

10. The combination in accordance with claim 1 in which each of said line signal circuits includes an impedance which is also connected in shunt with respect to said discharge current applying means and which has an impedance value substantially the same as the characteristic impedances of such line circuit and said applying means.

11. The combination in accordance with claim 1 in which each of said line signal circuits comprises EXCLUSIVE OR logic means, including said applying means, for connecting said charge storage diode to be alternately charged by said line signal current and discharged by said applying means.

12. The combination in accordance with claim 1 in which each of said line signal circuits comprises a line switch selectably actuatable for connecting a terminal of the charge storage diode of the same line signal circuit to a ground reference point, a potential source connected in parallel with said line switch, and poled for driving current through the charge storage diode of such line circuit in the reverse direction for such diode in said discharge current applying means, and means selectably opening the line switch of one of said line signal circuits to interrupt the charging of the charge storage diode therein and thereby also actuate said discharge current applying means.

13. The combination in accordance with claim 12 in which said line switch opening means comprises means selectably actuating the line switches of said line signal circuits one at a time in a predetermined sequence for opening said line switches in such sequence.

14. The combination in accordance with claim 12 in which a current limiting resistor is provided in each of said line signal circuits, and means are provided for connecting such resistor in series with said potential source in its parallel connection with the line switch of such line.

* * * * *